(12) United States Patent
Etkin

(10) Patent No.: US 7,890,871 B2
(45) Date of Patent: Feb. 15, 2011

(54) SYSTEM AND METHOD FOR DYNAMICALLY GENERATING, MAINTAINING, AND GROWING AN ONLINE SOCIAL NETWORK

(75) Inventor: Henry Etkin, New York, NY (US)

(73) Assignee: Redlands Technology, LLC, Wilmington, DE (US)

( * ) Notice: Subject to any disclaimer, the term of this patent is extended or adjusted under 35 U.S.C. 154(b) by 322 days.

(21) Appl. No.: 11/213,573

(22) Filed: Aug. 26, 2005

(65) Prior Publication Data

US 2006/0048059 A1 Mar. 2, 2006

Related U.S. Application Data

(60) Provisional application No. 60/604,562, filed on Aug. 26, 2004.

(51) Int. Cl.
*G06F 3/00* (2006.01)
(52) U.S. Cl. .................. 715/738; 715/741; 715/742; 715/753
(58) Field of Classification Search .................. 715/733, 715/811, 758, 738, 741, 742, 753; 709/223
See application file for complete search history.

(56) References Cited

U.S. PATENT DOCUMENTS 7,167,910 B2 * 1/2007 Farnham et al. ............. 709/223
7,234,117 B2 * 6/2007 Zaner et al. .................. 715/758
2002/0062368 A1 * 5/2002 Holtzman et al. ........... 709/224
2003/0158855 A1 * 8/2003 Farnham et al. ............. 707/102
2005/0015432 A1 * 1/2005 Cohen ........................ 709/201

OTHER PUBLICATIONS

Microsoft® Outlook® 2000 SP-3 Copyright (c) 1995-1999 Microsoft Corp, pp. 1-3.*

* cited by examiner

*Primary Examiner*—Steven P Sax
*Assistant Examiner*—Andrey Belousov
(74) *Attorney, Agent, or Firm*—Withrow & Terranova, PLLC

(57) ABSTRACT

An on-line community/social network system and method for provide a novel technique that enables an on-line community system to obtain information necessary to provide additional and more robust features to its users, solely from the user's participation in the community, and without requiring the users to do anything else (i.e., to explicitly provide the needed information). From this core approach, a number of advantageous novel techniques are provided by the inventive system to greatly enhance the quality and usefulness of various features and services that can be offered to community users as well as to provide them with entirely new and unique features as a result of user-specific data generated by the system's novel infrastructure.

13 Claims, 2 Drawing Sheets

SYSTEM AND METHOD FOR DYNAMICALLY GENERATING, MAINTAINING, AND GROWING AN ONLINE SOCIAL NETWORK

CROSS REFERENCE TO RELATED APPLICATION

The present patent application claims priority from the commonly assigned U.S. provisional patent application Ser. No. 60/604,562 entitled "SYSTEM AND METHOD FOR DYNAMICALLY GENERATING, MAINTAINING, AND GROWING AN ONLINE SOCIAL NETWORK WITH A BENEFICIAL FUNCTIONALITY THAT AUTOMATICALLY INCREASES AS A RESULT OF NETWORK UTILIZATION" filed Aug. 26, 2004.

FIELD OF THE INVENTION

The present invention relates generally to systems and methods for providing and managing on-line user communities, and more particularly to a system and method for automatically generating, maintaining, and growing a multi-function on-line social network with advantageous functionality that automatically increases based on data implicitly derived from routine utilization of the network by the users.

BACKGROUND OF THE INVENTION

Since computer users have first been able to communicate with one another through a telecommunication connection between their computers, there has been a growing desire to utilize computers and telecommunication systems for social interaction with others. While e-mail provided one-to-one communication, with the advent of early dial-in bulletin board systems (BBS) in the early 1980s, computer users discovered the joy of being able to communicate with many other users at once. Most of the early BBSs were either dedicated to particular interests, or were used by groups of friends or other types of socially connected individuals.

In recent years, the popularity of the Word Wide Web (WWW) coupled with incredible growth in availability and accessibility of high bandwidth Internet connections resulted in an unprecedented proliferation of "on-line communities." These phenomena include, but are not limited to, chat-rooms, on-line forums, groups, clubs, and digital photograph-sharing websites. In particular, on-line "portals" that provided WWW users with a variety of services (e.g., searching, news, free-email, etc.) immediately recognized the great value of hosting (i.e., providing storage resources and administration tools to) such communities. The more time the users spent using the communities, the greater their exposure to the hosting portal's advertising and other offered fee-based services.

As a natural extension of the concept of on-line communities there have been many efforts to translate the benefits of multiple-interest groups of users into advantageous business models or to otherwise utilize them for business purposes. These efforts typically took several different approaches: (1) websites for digital image sharing and management, (2) on-line merchant systems utilizing user-feedback for making product or service recommendations based on feedback received from other users with similar interests (also known as collaborative filtering), (3) systems that facilitate on-line and real-world social activities, such as event-planning and contact management websites; and (4) dating websites which attempt to match users to one another using a number of different techniques.

However, all of the above approaches suffer from a number of disadvantages that prevented their implementations from gaining more than a casual popularity:

1) Most of them were add-ons to, and/or functioned separately from, the on-line communities while those functions that were integrated into the community systems did not provide sophisticated features (e.g., robust and full-featured contact management, event planning and others were separate systems from the on-line community systems that had basic photo albums, calendars, and member contact lists);
2) The users had to learn how each system worked and had to keep track of what they did with which system (e.g., one website used for automatic contact management, another for photo sharing, and a third one for on-line social activity);
3) For the community or related service to grow, new users had to be attracted through advertising or more often by invitation from existing users; and
4) Most importantly, all of the approaches required the users to make significant efforts to take advantage of their features, with a greater desired quantity and quality level of features requiring a greater effort on the part of the user (e.g., to get movie recommendations, the user had to rate many movies themselves, or had to identify his friends as contacts for a contact management and/or event planning website).

The fourth disadvantage noted above has been the greatest barrier to further evolution of on-line communities and related services/functions. It is well known that the attention span of an average on-line user is tiny. In fact, the very reason that the portals are constantly developing new services and features, is to keep the users on their websites as long as possible. Accordingly, providing the information to a system to take advantage of its features often took more effort that most users were willing to put in, and the users either ignored the service or feature, or more often gave up before all necessary information was provided, and then disparaged the "poor quality" of the feature. Also the growth of virtually all communities (aside from Adult-oriented ones) has been relatively slow as most new users are added by existing uses having to make a significant effort to invite others. Even though, in the last few years, new developments in the online communities called "social networks" have solved at least some of the above disadvantages, the key challenge of lack of desire by users to make efforts to contribute to system functionality, remains unanswered.

It would thus be desirable to provide a system and method for automatically generating, maintaining, and growing a multi-function on-line social network. It would also be desired to provide a system and method for implementing beneficial functionality, for an on-line social network, that automatically increases in scope and quality based on data implicitly derived from routine utilization of the network by the users without requiring additional efforts form the users. It would further be desirable to provide a self-expanding dynamic infrastructure for an on-line social network that automatically increases the number of features available to the users based on the user's continued utilization of the network.

BRIEF DESCRIPTION OF THE DRAWINGS

In the drawings, wherein like reference characters denote elements throughout the several views.

SUMMARY OF THE INVENTION

Figure 1:
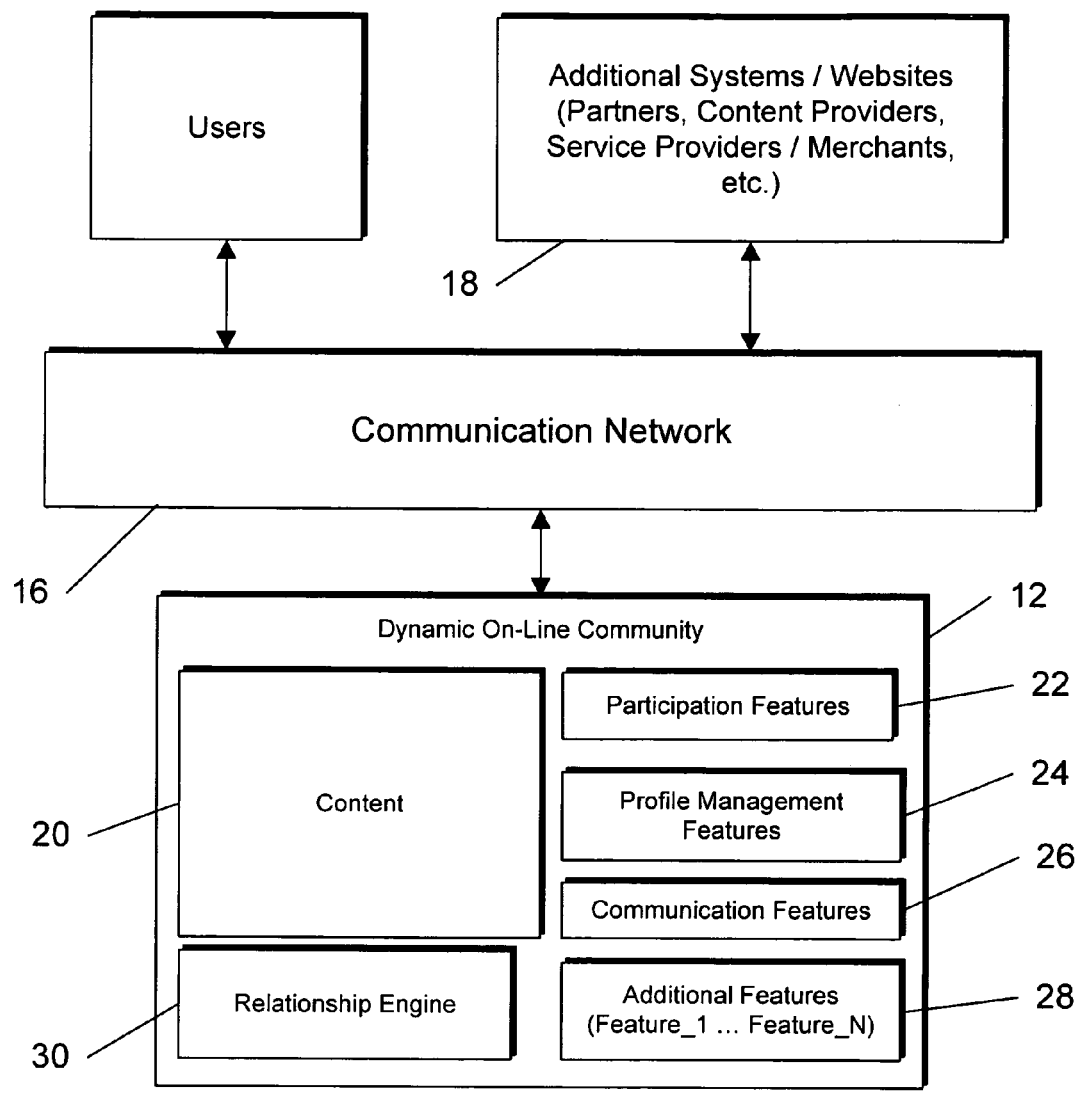
FIG. 1 is a schematic diagram of the novel system for automatically generating, maintaining, and growing a multi-function on-line social network having features that increase in number, scope, and quality based on system utilization.

The system and method of the present invention advantageously overcome the drawbacks of previously known on-line community and social network systems. The present invention relates to a system and method for implementing an intelligent on-line social network with numerous beneficial features for its members, that automatically grows and increases in functionality as a result of user's routine activities on the network's website, and without requiring the users to make any additional effort. The novel social network and community system allows groups of users in various social relationship categories (friends, acquaintances, relatives, co-workers, colleagues, or any combination thereof) to socialize with each other primarily through on-line sharing of their content data (e.g., images, text, Blogs, video, audio, etc.).

In one embodiment of the invention, a novel technique is provided and implemented that enables an on-line community system to obtain information necessary to provide additional and more robust features to its users, solely from the user's participation in the community, and without requiring the users to do anything else (i.e., to explicitly provide the needed information). From this core approach, a number of additional advantageous novel techniques are provided by the inventive system to greatly enhance the quality and usefulness of various features and services that can be offered to community users as well as to provide them with entirely new and unique features as a result of user-specific data generated by the system's novel infrastructure.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The system and method of the present invention advantageously overcome the drawbacks of previously known on-line community and social network systems. The present invention relates to a system and method for implementing an intelligent on-line social network with numerous beneficial features for its members, that automatically grows and increases in functionality as a result of user's routine activities on the network's website, and without requiring the users to make any additional effort. The novel social network and community system allows groups of users in various social relationship categories (friends, acquaintances, relatives, co-workers, colleagues, or any combination thereof) to socialize with each other primarily through on-line sharing of their content data (e.g., images, text, Blogs, video, audio, etc.).

The core concept of the present invention is based on the fact that on-line users have short attention spans and that it is very difficult to get on-line users to do anything that they would not normally do in the course of their online activities even if the additional activity eventually benefits them (i.e., it is hard to get users to rate hundreds of movies before a website can produce useful recommendations). That is why the vast majority of previously known on-line community systems have not progressed much beyond their originally offered simple features. As a result of the above, even relatively sophisticated and useful on-line services such as global contact management (applications that automatically notify a user's contacts of any changes in the user's contact information) and event planning (automatic meeting, get-together, and other social activity notices), have achieved only limited success. Another challenge addressed by the present invention is the goal of increasing the time that users spend on a particular website in light of their short attention spans.

Accordingly, the inventive system/methodology provides a novel technique that enables an on-line community system to obtain information necessary to provide additional and more robust features to its users, solely from the user's participation in the community, and without requiring the users to do anything else (i.e., to explicitly provide the needed information). From this core approach, a number of advantageous novel techniques are provided by the inventive system to greatly enhance the quality and usefulness of various features and services that can be offered to community users as well as to provide them with entirely new and unique features as a result of user-specific data generated by the system's novel infrastructure.

These additional features greatly improve the social aspects of the utilization of the novel system by the users, and also provide specific incentives for users to spend as much time as possible on their participation in the community. Finally, because the users are provided with substantial functionality and enhanced social activity capabilities, without requiring any special effort therefrom, the users have further incentives to utilize the system. Finally, the novel system, in conjunction with third parties, can offer products and services to the users that are automatically and specifically tailored to the user without requiring the user to provide any information about themselves.

In should be noted that the present invention is described with reference to the Internet, "on-line" activities, and "web-sites" by way of example only and for the sake of convenience and clarity. As a matter of design choice, the system and method of the present invention can be readily implemented in any environment where multiple users can share content data with one another and interact therewith.

Figure 2:
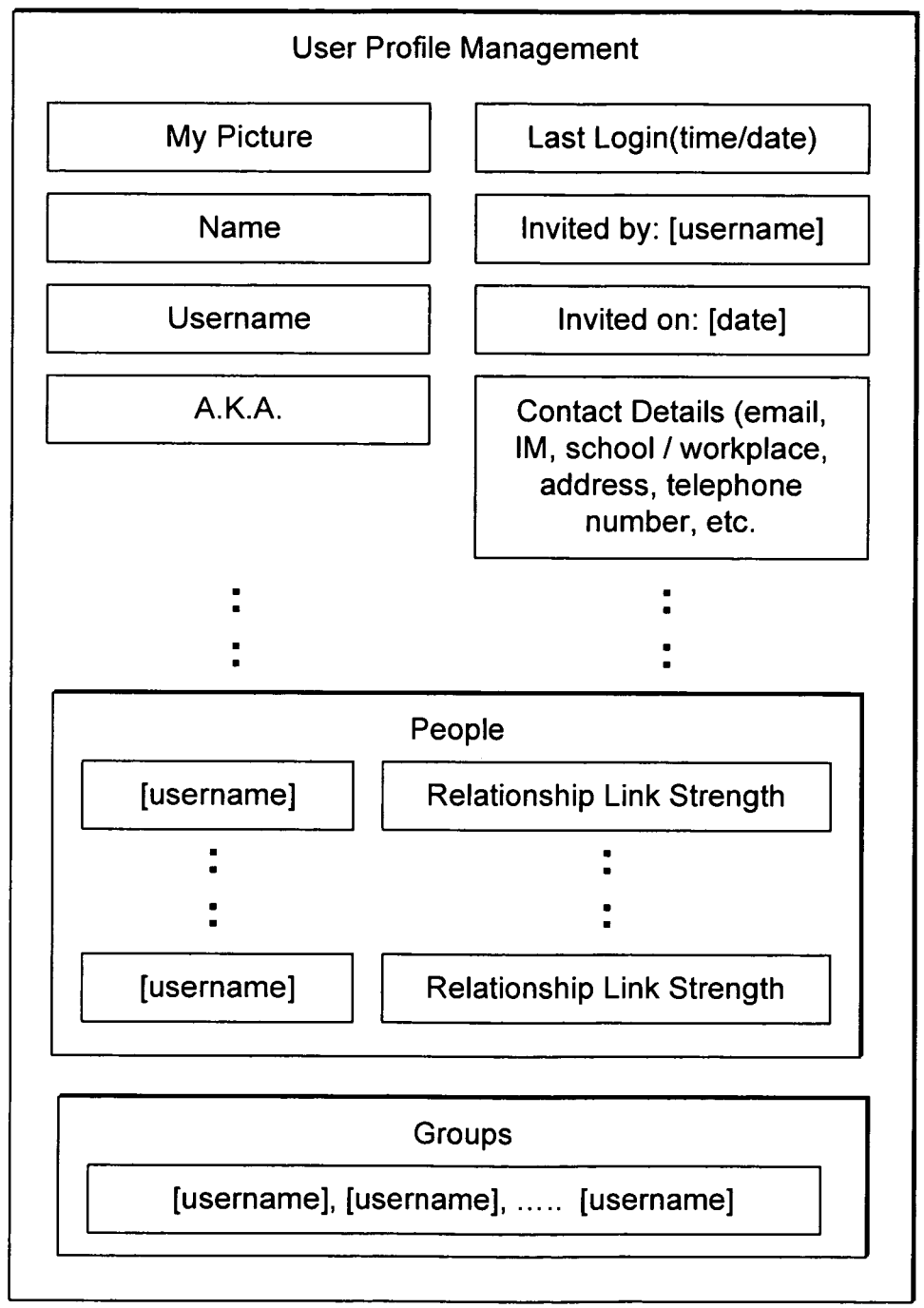
FIG. 2 is an diagram of an exemplary embodiment of a profile management feature of the inventive system of FIG. 1.

Referring now to FIG. 1, an overall social network 10 is shown. The network 10 includes an inventive dynamic on-line community system implemented as a website or similar system, that may be interacted with by users 14 through a communication network 16 (e.g., the Internet, etc.). Optionally, the system 12 may also communicate and interact with one or more additional systems and/or websites 18. The system 12, which is preferably configured with a website interface, includes, in addition to the standard features and functions of conventional websites, content 20 (e.g., images, text, Blogs, video, audio, etc.) and participation features 22, which enable the users 14 to upload, tag, discuss, and comment on, the content 20, and to otherwise interact with one another. The participation features 22 may include, but are not limited to, chat rooms, discussion forums, "chatter boxes", comment posts, and the like. The system 12 is additionally provided with profile management features 24 that enable the users, to manage their information and content 22 uploaded by them to the system 12. Referring now to FIG. 2, an exemplary set of profile management features is shown. It should be noted, that the system 12 preferably includes privacy features that block access to user information from anyone without an account therewith to protect user information from automatic data harvesting programs.

Communication features 26 are also provided to the system 12 to enable the system 12 to send out informational communications to the users 14 and to interact with additional systems 18. The system 12 further includes a set of additional optional features 28 for providing the users 14 with additional functionality, such as event planning, contact management, the ability to purchase content 20 related products, as well as other capabilities discussed in greater detail below.

The core of the novel system 10 is a dynamic relationship engine 30, implemented as a software application, that automatically and implicitly recognizes relationships between the community users 14 (based on content 20 as well as utilization, by the users 14, of the participation features 22), and generates dynamic mutable relationship links between the users 14 that reflect these relationships. Advantageously, the engine 20 does not require a user to make an effort to explicitly list their relationships, and the scope thereof, with other users (e.g., "Joe and Mary are friends, while Bob is an acquaintance"). The automatic dynamic relationship links form the platform upon which many of the other novel features of the system 12 are based.

In essence, the relationship engine 30 operates based on based on identification (i.e. "tagging") of content 20 data by the originating user, as well as from interaction of the other users 14 therewith (e.g., other users commenting on the user's content, etc.). In cases of certain types of content 20 (e.g., text, Blogs), tagging may be performed automatically or semi-automatically. It is well known that users posting content (pictures, etc.) always label or tag the content in some manner, for example, labeling a picture "Me and Joe on vacation in New York". The relationship engine 30 advantageously utilizes the routine user activity of content labeling to automatically extract information such as names of other users related to the content (e.g., names of other people (users, etc.) in a picture, names of users mentioned in a text file, etc.), geographic information (e.g., where a picture was taken), group information (e.g., "this is our chess club" for a picture), time information (e.g., when was the content 20 generated and when was it uploaded to the system 12), as well as virtually any other keywords that can be parsed from a free-form description or label of the content. User-identification of the uploaded content 20 is further encouraged and facilitated because the relationship engine 30 extracts necessary information from free-form natural language descriptions rather than requiring users to fill out multiple keyword fields. Of course, the users are fully capable of formulating their tag in any way they choose, including listing explicit keywords.

For example, in case of photographic content, individual photos or entire albums can be labeled/tagged with the names of the people appearing in the photos as well as free-form keywords and geographic data. This meta-data is indexed and cross referenced by the relationship engine 30, not only providing information necessary to generate and keep track of the relationship links, but also greatly assisting the organization and retrieval of the photos by the users 14. Examples of the various functions available to the users, as a result of interaction with the relationship engine 30, are described in greater detail below.

The relationship links are created and managed by the relationship engine 30 based, at least in part, on the following indicators, each of which contributes a certain proportional weight to a relationship link value:

1) The frequency with which certain users appear in the content originated by a particular user (as evidenced by the content label/tag information), contributes to the level of strength of a relationship link between these users and the originating user. For example, if a user appears in two photographs with another user, this indicator of the relationship link will have a low value, while if the they appear together in hundreds of photographs, this indicator is proportionally higher;

2) One or more of the number, frequency, and size of comments made by particular users on other users' content;

3) The time factors involved in the above two indicators— e.g., how long have the users been appearing in each others content, when was the last time they appeared together, when was the last comment made by a particular user on another user's content, etc.; and 4) Other key words parsed from the content labels of a particular user compared with key words extracted from the content labels of other users. This indicator can thus identify groups of users (e.g., soccer team members) and also common interests between the users—for example, if users appear in a number of pictures together that are also labeled as "camping" or "paintball", the relationship engine 30 can increase the strength of the link between them and also keep a record of the interests of the particular users.

Because the relationship engine 30 continually monitors all of the above indicators, all of the relationship links are automatically kept up to date without special input from the users. Based on the strength of the above-described indicators, the relationship links developed by the engine 30 are quite sophisticated, and indicate not only the existence of a relationship with another user, but also the degree of the relationship (e.g., close friend, friend, acquaintance, etc.), its status (e.g., whether the relationship is current or in the past), and commonalities (similar interests, membership in social or other types of groups, etc.).

Furthermore, on the basis of relationship link strengths, the novel engine 30 is capable of automatically identifying and distinguishing between sub-groups of users that are closer to one another than to other users in a relationship group. For example, the engine 30 can automatically recognize that while Jim, Sue and Bob belong to a larger group of friends, they are closer to one another than to anyone else in the group, while at the same time noting that Sue is closest to Jessica, a friend in the larger group who is not particularly close to Jim and Bob.

As noted above, the inventive relationship engine 30 thus automatically continually adjusts and changes the relationship links and groupings based on the activities of the users on the website utilizing the engine. Thus, simply using various features of the system 12 allows the engine 30 to learn and keep track of existence and degree of relationships between the users 14. In effect, the inventive relationship engine 30 provides a beneficial feed-back loop—it both enables the various advantageous features of the system 12 and also learns from their utilization by the users 14.

Because, the relationship engine 30 relies at least in part of content 20 labeling and related functions, the participation features 22 are very important in enabling the users 14 to annotate and flexibly arrange their content into content albums, as well as to add journal entries. This enables users to maintain 'Blogs' that are thoroughly intertwined with their content (such as photos, audio, video, etc.). In commenting on each others content 20, the users 14 further automatically enhance the relationship engine 30. Participation features 22 can also include dynamically built private and public discussion areas made available to groups of users that are automatically identified by the relationship engine 30 based on their relationship links.

The system 12 is particularly advantageous with respect to image-based content 22. With the popularization of digital photography and the resulting realization that there is no additional cost to taking more photos, the sheer number of photos taken is growing rapidly unmanageable. The system 12 not only offers intuitive, flexible and unique ways of organizing and sharing digital images, but also automatically derives many useful features (as described in greater detail below) and improves the usefulness thereof based solely on the routine activity of image sharing.

The participation features 22 may be used to submit content 20 to the system 12 in a number of different user-friendly ways, allowing even those users who are not technologically adept easy access. For example, digital photographs can simply be "dragged and dropped" in, uploaded via standard protocols, automatically grabbed from another photograph hosting website, emailed, or even sent via 'Picture Message' (MMS) from a mobile communication device. With a suitable film processing partner, the system 12 is capable of accepting undeveloped film as well.

One key beneficial aspect of the inventive system 12, may be implemented as a synergy of the participation features 22 and the communication features 26 to greatly enhance and automate the growth and increasing usefulness therefrom. While in most conventional on-line community systems users must use a specific "invite" feature to invite other users to the community, the system 12 enables automatic generation of invitations to individuals who are not currently using the system 12, based on their appearance in the content 22 posted by current users of the system 12. Thus, when a user labels a photograph with identifiers of those appearing therein, any identifiers not corresponding to current users 14 of the system 12, are flagged and the user is given the option of allowing automatically-generated invitations to be sent to them on the user's behalf.

As the number of users 14 grows, the novel system 12 gains an additional significant advantage in that any new invited users that begin using the system 12 immediately gain access to numerous useful features, as it very likely that since a number of their friends are among the users 14, instant detailed relationship links may be established by the relationship engine 30 as soon as the new user registers.

In addition, as most of a particular user's friends and acquaintances will among the users 14, the system 12 can serve as a central repository for storing and keeping track of contact information. Advantageously, the system 12 can enable intelligent contact updating so that changes in a user's contact information are sent only to individuals with a relationship link to the user of a predefined strength, and not to every single person in the user's email program contact folder. Furthermore, the system 12 can optionally provide a privacy system module that, in conjunction with the relationship engine 30, enables the users to perform a one-time rule definition for their contact information that can selectively restrict not only what portion of the user's contact information is visible to other system 12 users, but in addition determines what type of contact information updates are sent to other users based on relationship link strength. For example, a user can define a following exemplary privacy rule set:

Display/auto-update my email address only to users with a relationship link strength greater than 5;

Also display/auto-update my address to users with a relationship strength greater than 10; and Also display/auto-update my address to users with a relationship strength greater than 15

The novel relationship link based privacy system enables users to be selective with disclosure of their personal information without having to constantly manage complex permissioning parameters.

The novel system 12, can readily provide a virtually unlimited number of additional beneficial features to the users 14 by utilizing the relationship links generated and maintained by the relationship engine 30. Examples of these beneficial features (which may be free, premium, or a combination of both, as a matter of design choice) include, but are not limited to, the following:

Flexible Power Search: Due to utilization of novel indexing and cross-referencing in conjunction with the relationship engine 30, users 14 can query the system 12 in a wide variety of novel ways (e.g. "Show me pictures of myself with John at school") For example for photographs that are part of content 22, the users 14 can also view photos taken at an event by several different people all together, or look for "Pictures I might be interested in" or "recent popular photos" based on criteria leveraged against the relationship links for the user generated by the engine 30.

Exploration of Relationship Links: Because the relationship engine 30 keeps track of which users appear in each content 22 item, and exposes at least a portion of the relationship information, users can readily explore their relationship links as well as the relationship links of their friends and other users. For example, the system 12 can show, for each user 14, a list of other users with which they appear in content items (e.g., photos) along with hyperlinks, so that anyone following the hyperlink can instantly view all of the content in which the two users appear.

Automatic Notification: A highly flexible notification feature keeps users 14 abreast of new content 22 that they would be interested in (e.g. when users with a relationship link strength that meets a predefined threshold upload new content, or comment on the user's own content). Notifications can be delivered in a multitude of channels: from being delivered via a desktop application, to email, or to a mobile communication device utilizing SMS/MMS.

Automatic Event Organizing: This feature offers event organizing functionality that is integrated with the other aspects of the system 12. Thus a user can pick out their friends using the relationship engine 30 and the contact information feature, discuss the event in the discussion areas, keep the invitees aware via the notification feature, and finally document the event with photos taken by them and other people (even while in progress if they have a MMS capable mobile communication device). All of this is accomplished without forcing the user to manually keep and update invitee lists.

Geographic Relationship Visualization: With this feature, the system 12 uses geographic tag data extracted by the relationship engine 30, to graphically display a particular user's relationship links on a map of any scale to show clusters of locations of other users having a relationship with that user as well as identify the strength of the relationships. In this manner, a user can visually see the concentrations of their friends and acquaintances in various geographical areas. This feature is particularly useful when users plan trips and can readily discover if any of their friends are located close to their travel destination.

Content-Based Product Offerings: With certain types of content 22, users 14 are given the capability to acquire products based on the content 22 (e.g., high resolution prints, t-shirts, mugs or keychains with pictures of a group paintball outing). An optional feature that may be provided by the system 12, is based on an automated incentive "credit" system, that accumulates credits for each user based on how many products based on their originated content are ordered. Optionally, the credits may be used to order products themselves or to use premium system features.

Relationship-Driven Business Applications: Because the relationship engine 30 operates in a uniform and flexible manner, it can be readily configured to advantageously drive many business applications, such as movie, music, book or other product suggestions based on preferences of their friends rather than some strangers who happened to buy (or who like) a similar product to the user. This feature actually makes recommendations and suggestions incredibly useful as it is well known that users tend to listen to the same music, read the same books, and watch the same movies as their friends. The accuracy and utility of this feature can be further improved by utilizing relationship link strength as a weight applied to the recommendation module driven by the relationship engine 30. Furthermore, the users 14 can be given the ability to actively utilize this feature, for example, asking "what music are my friends listening to?" or "what was my friends' favorite movie in the last 3 weeks?" The novel relationship engine 30 readily provides useful and relevant answers to virtually any such query.

Intelligent Dynamic "White-List" Filtering: It is well recognized that the ever-present eMail spam is one of the greatest problems facing on-line users. While a great deal of effort has been made to develop sophisticated spam-filtering applications, all of them suffer from the disadvantage of occasionally blocking messages from users friends and acquaintances. The only way to avoid this unfortunate side-effect of spam-blocking is forcing users to either create "safe senders lists" and/or add safe senders to the list as new eMail is received. However, in many cases the users may forget to add all of the appropriate people to the safe sender list. In cases of strong eMail filtering, users may not even see the message sent by a friend before it is blocked by the filter. The system 12 enables automatic generation of a dynamic safe sender list based on the users' constantly evolving relationship links and on the eMail addresses supplied by the linked users. With this novel feature, not only are the users freed from having to create and maintain safe sender lists for their friends and contacts, but the safe sender list is automatically updated for each user based on changes in the relationship links and changes in contact information for the users in the list.

While the core aspect of the inventive system 12 is its automated implicit data acquisition, it should be noted that as a matter of design choice, the users 14 may be given full explicit data input capabilities that may be readily utilized to directly supply the relationship engine 30 with relationship-relevant data, without departing from the spirit of the invention. Additionally, the system and method of the present invention are completely language independent and may thus be applied to, and utilized with any language.

Thus, while there have shown and described and pointed out fundamental novel features of the invention as applied to preferred embodiments thereof, it will be understood that various omissions and substitutions and changes in the form and detail lighting modes 1 to 3s of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A method performed on a computer for determining relationships between members of a content sharing service comprising:

receiving a digital content comprising one of a digital picture and a digital video from a computer associated with a first member of the content sharing service, wherein the digital content includes a tag element that identifies an individual depicted in the digital content, and wherein the digital content does not comprise an electronic mail message;

processing the tag element to determine a name of the individual depicted in the digital content;

determining that the name is associated with a second member of the content sharing service;

generating a relationship link comprising a member identification field that contains data identifying the second member, and a relationship strength field;

storing the relationship link in a memory;

receiving a second digital content comprising one of a digital picture and a digital video from a second computer associated with the second member, wherein the second digital content includes a second tag element that identifies a second individual depicted in the second digital content;

processing the second tag element to determine a second name of the second individual depicted in the second digital content;

determining that the second name is associated with the first member;

obtaining the relationship link from the memory;

modifying a relationship strength value in the relationship strength field of the relationship link to indicate a greater relationship strength between the first member and the second member; and storing the relationship link in the memory.

2. The method of claim 1, further comprising receiving an update to contact information associated with the first member from the first member via the computer and, based on the relationship link, sending a message to the second member indicating the update to the contact information associated with the first member.

3. The method of claim 2, further comprising obtaining the relationship strength value from the relationship strength field in the relationship link, comparing the relationship strength value to a predetermined threshold value and, wherein sending the message to the second member further comprises sending the message to the second member indicating the update to the contact information associated with the first member based on the comparison between the relationship strength value and the predetermined threshold value.

4. The method of claim 1, further comprising receiving, from a third computer associated with a third member of the content sharing service, a textual comment for association with the digital content, associating the textual comment with the digital content, generating a second relationship link comprising the member identification field that contains data identifying the third member; and storing the second relationship link in the memory.

5. The method of claim 1, further comprising:
receiving a third digital content comprising one of a digital picture and a digital video from the computer associated with the first member, wherein the third digital content includes a third tag element that identifies a third individual depicted in the third digital content;
processing the third tag element to determine a third name of the third individual depicted in the third digital content;
determining that the third name is associated with the second member;
obtaining the relationship link from the memory;
modifying the relationship strength value in the relationship strength field of the relationship link to indicate the greater relationship strength between the first member and the second member; and
storing the relationship link in the memory.

6. The method of claim 1, further comprising receiving a request from the computer associated with the first member to modify a preference of the first member, wherein the preference identifies a title of a movie preferred by the first member, and based on the relationship link, sending a message comprising a recommendation of the movie to the second member.

7. A computer server for determining relationships between members of a content sharing service comprising:
a network interface adapted to interface with a network; and
a controller coupled to the network interface and adapted to:
receive a digital content comprising one of a digital picture and a digital video from a computer associated with a first member of the content sharing service, wherein the digital content includes a tag element that identifies an individual depicted in the digital content, and wherein the digital content does not comprise an electronic mail message;
process the tag element to determine a name of the individual depicted in the digital content;
determine that the name is associated with a second member of the content sharing service;
generate a relationship link comprising a member identification field that contains data identifying the second member, and a relationship strength field;
store the relationship link in a memory;
receive a second digital content comprising one of a digital picture and a digital video from a second computer associated with the second member, wherein the second digital content includes a second tag element that identifies a second individual depicted in the second digital content;
process the second tag element to determine a second name of the second individual depicted in the second digital content;
determine that the second name is associated with the first member;
obtain the relationship link from the memory;
modify a relationship strength value in the relationship strength field of the relationship link to indicate a greater relationship strength between the first member and the second member; and
store the relationship link in the memory.

8. The computer server of claim 7, wherein the controller is further adapted to receive an update to contact information associated with the first member from the first member via the computer, and based on the relationship link, send a message to the second member indicating the update to the contact information associated with the first member.

9. The computer server of claim 8, wherein the controller is further adapted to obtain the relationship strength value from the relationship strength field in the relationship link, compare the relationship strength value to a predetermined threshold value, and based on a comparison between the relationship strength value and the predetermined threshold value, the controller is further adapted to send the message to the second member indicating the update to the contact information associated with the first member.

10. The computer server of claim 7, wherein the controller is further adapted to receive, from a third computer associated with a third member of the content sharing service, a textual comment for association with the digital content, associate the textual comment with the digital content, generate a second relationship link comprising the member identification field that contains data identifying the third member; and store the second relationship link in the memory.

11. The computer server of claim 7, wherein the controller is further adapted to:
receive a third digital content comprising one of a digital picture and a digital video from the computer associated with the first member, wherein the third digital content includes a third tag element that identifies a third individual depicted in the third digital content;
process the third tag element to determine a third name of the third individual depicted in the third digital content;
determine that the third name is associated with the second member;
obtain the relationship link from the memory;
modify the relationship strength value in the relationship strength field of the relationship link to indicate the greater relationship strength between the first member and the second member; and
store the relationship link in the memory.

12. The computer server of claim 7, wherein the controller is further adapted to receive a request from the computer associated with the first member to modify a preference of the first member, wherein the preference identifies a title of a movie preferred by the first member, and based on the relationship link, send a message comprising a recommendation of the movie to the second member.

13. A method performed on a computer for determining relationships between members of a content sharing service comprising:
receiving a digital content comprising one of a digital picture and a digital video from a computer associated with a first member of the content sharing service, wherein the digital content includes a tag element that identifies a location depicted in the digital content, and wherein the digital content does not comprise an electronic mail message;
processing the tag element to determine the location depicted in the digital content;
determining that the location is associated with a second member of the content sharing service;
generating a relationship link comprising a member identification field that contains data identifying the second member, and a relationship strength field;
storing the relationship link in a memory;
receiving a second digital content comprising one of a digital picture and a digital video from a second computer associated with the second member, wherein the second digital content includes a second tag element that identifies an individual depicted in the second digital content;
processing the second tag element to determine a name of the second individual depicted in the second digital content;
determining that the name is associated with the first member;

obtaining the relationship link from the memory;
modifying a relationship strength value in the relationship strength field of the relationship link to indicate a greater relationship strength between the first member and the second member; and
storing the relationship link in the memory.

* * * * *